United States Patent [19]

Steiger

[11] 4,070,997

[45] Jan. 31, 1978

[54] RECIPROCATING INTERNAL COMBUSTION ENGINE USING POWDERED SOLID FUEL

[75] Inventor: Anton Steiger, Illnau, Switzerland

[73] Assignee: Sulzer Brothers Limited, Winterthur, Switzerland

[21] Appl. No.: 718,516

[22] Filed: Aug. 30, 1976

[30] Foreign Application Priority Data

Mar. 5, 1976 Switzerland .................. 2752/76

[51] Int. Cl.² ............................................. F02D 19/04
[52] U.S. Cl. .................................. 123/23; 60/39.46 S
[58] Field of Search .................. 123/23, 24, 136, 1 A; 60/39.46 S

[56] References Cited

U.S. PATENT DOCUMENTS

| 1,719,023 | 7/1929 | Pawlikowski | 123/23 |
| 1,897,478 | 2/1933 | Holzwarth | 60/39.46 S |

FOREIGN PATENT DOCUMENTS

| 887,581 | 8/1953 | Germany | 123/23 |
| 450,727 | 7/1936 | United Kingdom | 123/23 |

Primary Examiner—Charles J. Myhre
Assistant Examiner—Craig R. Feinberg
Attorney, Agent, or Firm—Kenyon & Kenyon, Reilly, Carr & Chapin

[57] ABSTRACT

The nozzle in the cylinder head is supplied with solid particulate fuel, e.g. powdered coal, via a dosing wheel while a hollow slider in the nozzle blocks a supply of compressed air. After dosing, the hollow slider is moved into a position to block further entry of the particulate fuel while opening the nozzle to the compressed air supply. The fuel is then blasted out of the discharge openings of the nozzle into the combustion chamber of a cylinder.

16 Claims, 7 Drawing Figures

RECIPROCATING INTERNAL COMBUSTION ENGINE USING POWDERED SOLID FUEL

This invention relates to a reciprocating internal combustion engine using powdered solid fuel.

Heretofore, it has been known to deliver a fuel suspension formed from powdered coal and air, for example, via two coaxially arranged valves, to an antechamber of a combustion chamber of an internal cobustion engine in which the mixture is ignited and burned with the aid of oil. However, it is usually not advantageous to suspend the powdered coal in air for feeding to the combustion chamber as a uniform distribution of the powder during flow from the place where the suspension is formed to the antechamber cannot be assured. Therefore, since an apportioning of a defined quantity of powdered coal cannot be obtained during operation, the engine is usually charged to a different degree and, thus, has a different power output for each operating cycle. Further, the use of valves, which may be preferred under some conditions, is also disadvantageous in these engines. This is due to the fact that tight closing of the valve seating surfaces is not attainable over extended periods of time. This is because dust particles unavoidably settle on the seating surfaces of the valves and create a material build-up. Still further, special devices and added energy must be provided in order to form the suspension and then bring the suspension up to the compression pressure. This increases the costs of the installation and the operation substantially.

Accordingly, it is an object of the invention to improve an internal-combustion engine of the above type in such a manner that, with little extra cost for equipment and operation, the power delivered per working cycle becomes more uniform. (FIG.

Briefly, the invention provides a reciprocating internal combustion engine with at least one cylinder which defines a combustion chamber, means including a nozzle with discharge openings for supplying powdered fuel into the combustion chamber, an air supply means, a hollow slider to establish or block a connection between the air supply means and the discharge openings and a fuel dosing means.

The injection nozzle is mounted in a stationary manner in the engine to protrude into the combustion chamber while the discharge openings are located for passage of the fuel into the combustion chamber. The air supply means is of any suitable tupe for supplying air into the nozzle for passage through the discharge openings.

The hollow slider is mounted in the nozzle for movement between a first position establishing the connection between the air supply means and the discharge openings and a second position blocking the connection.

The fuel dosing means is placed in communication with the hollow slider in order to supply a charge of powdered fuel to the nozzle for each working cycle of the engine.

Due to the novel engine construction a precisely dosed amount of finely divided solid fuel is fed to the injection nozzle, i.e. a fuel suspension is not formed and transported to the cylinder. This ensures that the same amount of fuel is always supplied to the combustion chamber of the cylinder so that severe power variations as occur in the known engine are avoided. Another advantage of the engine is that the hollow slider does not use seating surfaces which are subject to material buildup. Further, as the engine does not require any means to form a suspension, the cost can be reduced. Similarly, because the fuel passes into the combustion chamber of the cylinder directly by means of the injected air, a component corresponding to the antechamber of the known engine is obviated. This contributes further to a reduction in the cost of equipment and the thermal problems associated with the antechamber. Furthermore, good macro-distribution of the finely divided solid fuel is achieved in the combustion chamber of the cylinder due to injection.

These and other objects and advantages of the invention will become more apparent from the following detailed description and appended claims taken in conjunction with the accompanying drawings in which:

Figure 1:
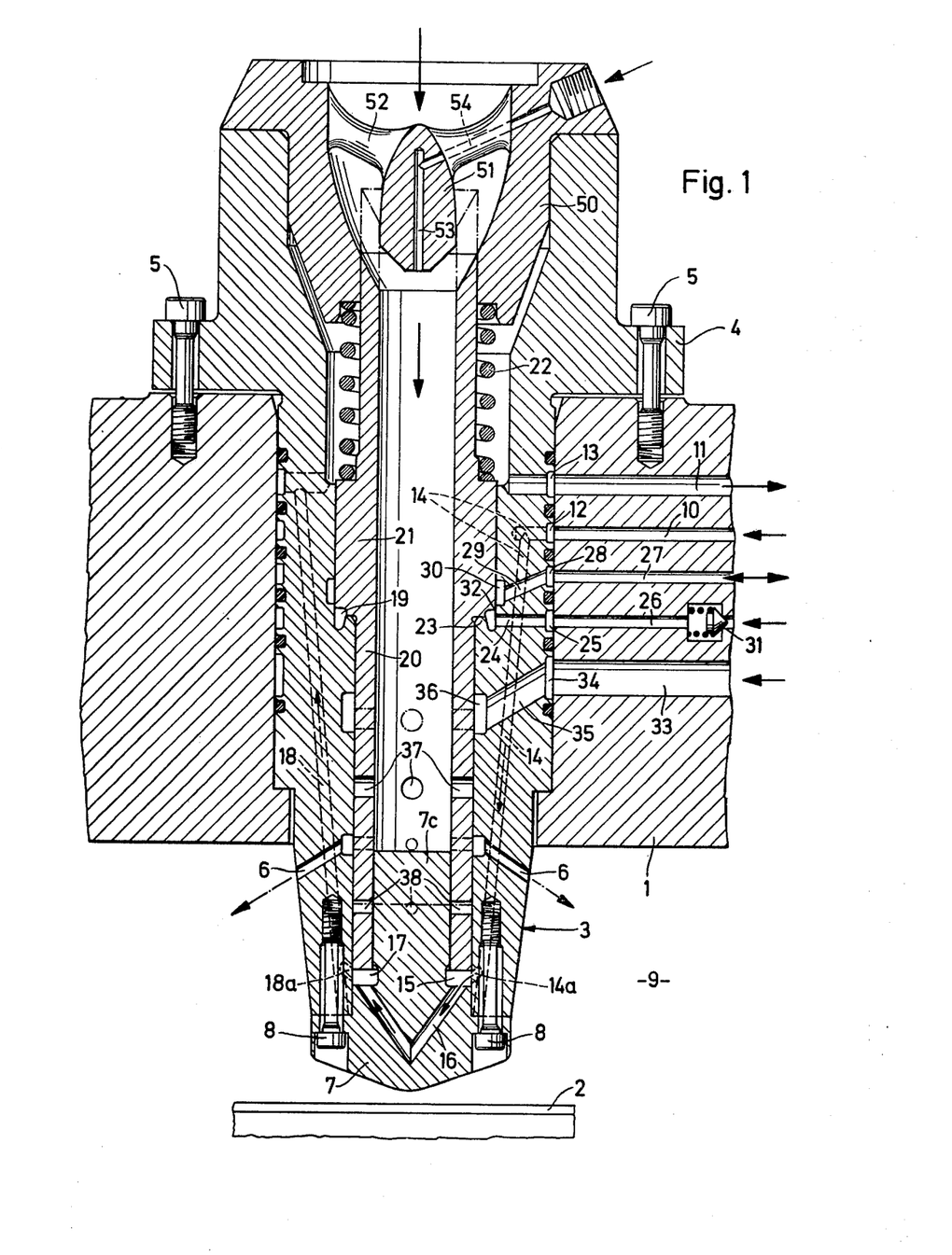
FIG. 1 illustrates an axial sectional view of a cylinder head of an internal combustion engine according to the invention.

Referring to FIG. 1, the reciprocating internal combustion engine has at least one cylinder head 1 secured in a known manner to a cylinder (not shown) which defines a combustion chamber 9 and has a working piston 2 movably disposed therein.

A means for supplying powdered fuel, such as powdered coal, to the combustion chamber includes, inter alia, an essentially tubular injection nozzle 3 which protrudes at the lower end into the combustion chamber 9 between the cylinder head 1 and the working piston 2 coaxially of the cylinder axis. The nozzle 3 is provided at the upper area with a flange 4 and is fastened in the cylinder head 1 by means of screw bolts 5 which pass through the flange 4.

The injection nozzle 3 also has discharge openings 6 which are located in the combustion chamber 9 and directed obliquely downward. These openings 6 serve to inject fuel into the combustion chamber 9 by means of blasting air. The lower face end of the injection nozzle 3 is covered by a cover 7 which is fastened to the nozzle 3 by means of screw bolts 8. A central extension 7c of the cover 7 projects into the nozzle 3 to the area of the fuel discharge openings 6.

The injection nozzle 3 is cooled. For this purpose, a coolant supply duct 10 and a coolant drainage duct 11 are provided in the cylinder head 1 and terminates in an annular groove 12 and 13, respectively, disposed in the outside surface of the injection nozzle 3. A plurality of ducts 14 emanate from the annular groove 12 and are distributed over the circumference of the injection nozzle 3 to extend radially at first and then conically towards the lower end of the nozzle 3. Only one of these ducts 14 is seen in FIG. 1. The lower end of each duct 14 leads via a tap hole 14a and a radial duct 15 to the cover 7 which is included in the cooling system via angularly disposed ducts 16. In FIG. 1, the left end of the duct 16 empties into a radial duct 17, from which a tap hole 18a leads to a duct 18 whose upper end ends in the annular groove 13 of the coolant drainage duct 11.

A hollow slider 20 is disposed within the injection nozzle 3 so as to be axially movable. In the position shown in FIG. 1, the slider 20 closes the fuel discharge openings 6. The hollow slider 20 is formed on the outside of the central area with a piston 21 in the form of a flange-like thickening with an upper face abutted against a compression spring 22. The other end of the compression spring 22 is supported on a ring-shaped insert 50 fastened to the upper end of the injection nozzle 3 in a manner not detailed. In the lowest position of the hollow slider 20, the lower face of the piston 21 rests against an annular shoulder 23 of the injection nozzle 3. This annular shoulder 23 is milled out on the outside to form an annular chamber 19 which communicates via one or more radial bores 24 with an annular groove 25 machined into the outside diameter of the injection nozzle 3.

A hydraulic means communicates with the opposite side of the piston 21 from the spring 22 in order to move the piston 21 and integral slider 20 against the force of the spring 22. This hydraulic means includes a duct 26 in the cylinder head 1 which connects with the annular groove 25 to supply hydraulic fluid, such as a liquid fuel, to the annular chamber 19 via the groove 25 and bores 24. A further duct 27 for supplying or discharging hydraulic fluid is also provided in the cylinder head 1 and connects with an annular groove 28 in the outside of the nozzle 3. The groove 28, in turn, communicates via bores 29 with an annular groove 30 on the inside of the nozzle 3 and about the slider 20. This groove 30 is located somewhat above the annular chamber 19. This arrangement of the annular groove 30 with respect to the annular chamber 19 in combination with a check valve 31 in the duct 26 achieves a damping of the downward motion of the hollow slider 20 so that the hydraulic fluid can drain from the annular chamber 19 through the duct 29 and bore 27 only in a heavily throttled manner after the lower outer edge 32 of the piston 21 has passed the annular groove 30.

An air supply means is also provided in the cylinder head 1 for supplying blasting air into the nozzle 3 for passage through the discharge openings 6. This air supply means includes a duct 33 in the head 1 which ends in an outer annular groove 34 of the injection nozzle 3. This annular groove 34 comminucates via one or more ducts 35 with an inner annular groove 36. The hollow slider 20 has a row of radial apertures 37 which, in the upper position of the slider 20 as indicated by dash-dotted lines in FIG. 1, are connected to the inner annular groove 36 to admit blasting air into the hollow slider 20 via the ducts 35, 33. In addition, the hollow slider 20 has a second row of radial openings 38 which, in the upper or working position of the hollow slider 20, communicates with the fuel discharge openings 6 in the injection nozzle 3.

The ring-shaped insert 50 at the upper end of the injection nozzle 3 has a central part 51 which is of stream-lined shape towards the top and is joined to the insert 50 by radial arms 52. The section of the part 51 located below the arms 52 is of a diameter which fits the inside diameter of the hollow slider 20 and is arranged so that the upper end of the hollow slider 20 in the upper position encloses the part 51. In this manner, the hollow slider 20 is sealed in the upper position against the delivery of powdered coal from a dosing means disposed above the insert 50. A bore 53 is provided in the center of the part 51 which is open towards the bottom and which, at the upper end communicates with an outwardly oriented bore 54 which extends through one of the arms 52 and is connected to an ignition oil supply line 55 (FIG. 2).

Figure 2:
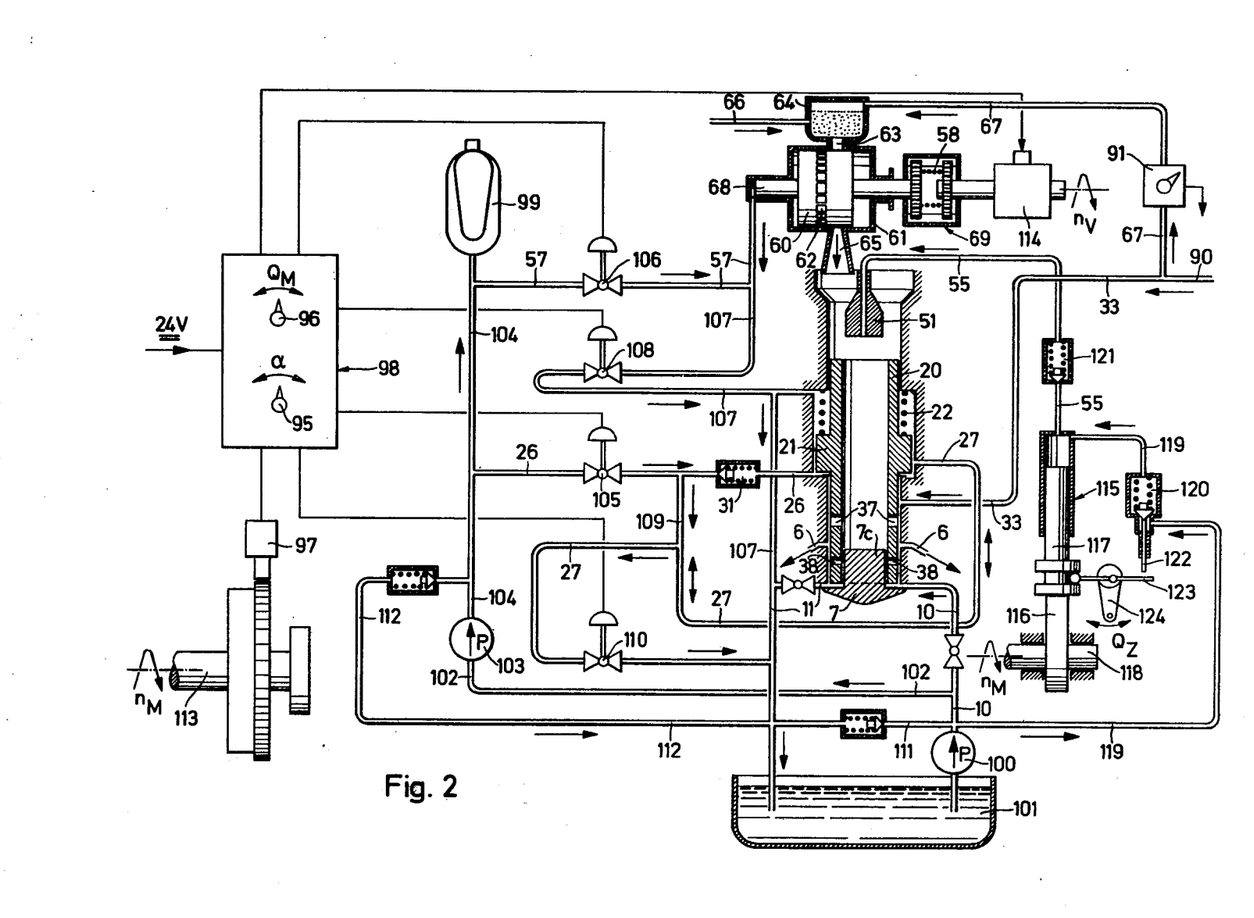
FIG. 2 illustrates a schematic of the powdered coal injection system according to the invention.
Figure 3:
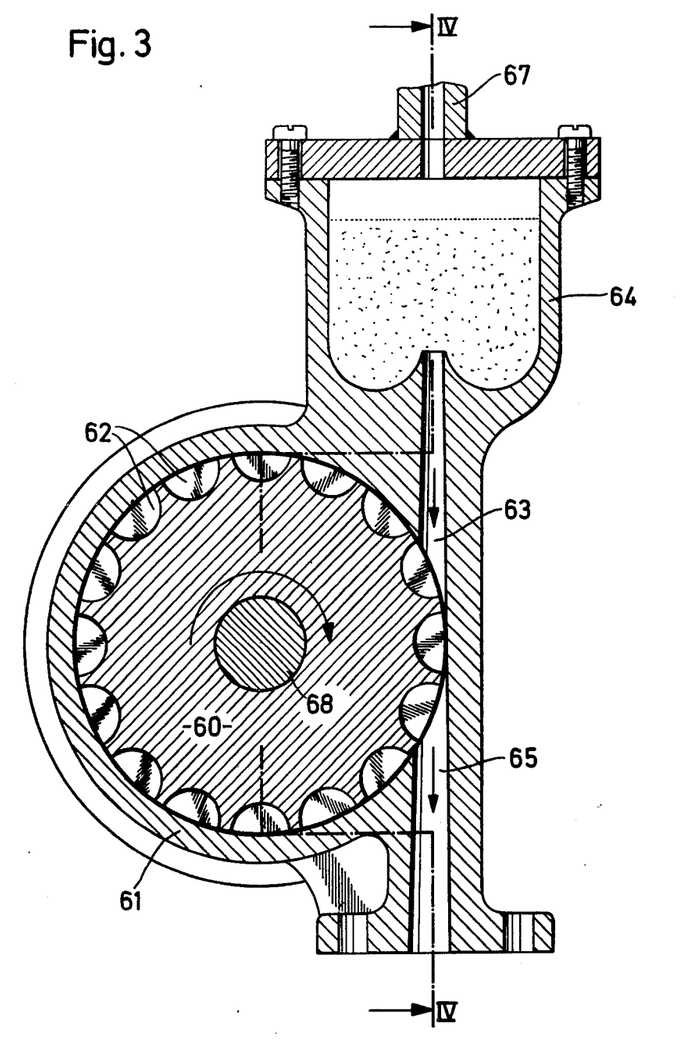
FIG. 3 illustrates a cross-sectional view of a powdered coal dosing means according to the invention.
Figure 4:
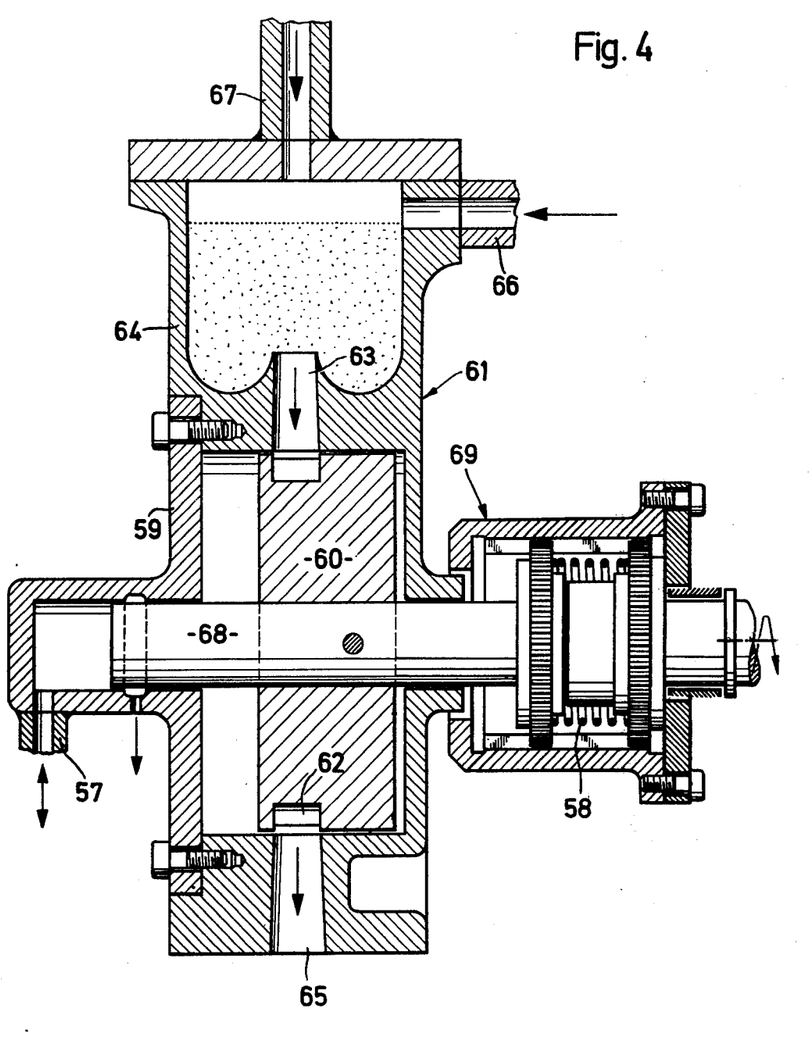
FIG. 4 illustrates a view taken on line IV—IV of FIG. 3.

Referring to FIGS. 3 and 4, the dosing means for the powdered coal include a compartment (or cell) wheel 60 which is rotatably mounted in a housing 61 and is also movable axially. The compartmented wheel 60 has cylindrical compartments or cells 62 which are evenly distributed over the circumference. The compartmented wheel 60 turns these cells 62 in the position shown in FIG. 4. past a passage 63 coming from a powdered coal storage chamber. A passage 65 extends below the wheel 60 as an axial continuation of the passage 63 and extends to the ring-shaped insert 50 of the injection nozzle 3 either directly or through a line to deliver charges of powdered fuel to the nozzle 3. The passages 63, 65 expand gradually in the powdered coal flow direction. The powdered coal is fed by means of a conveyor screw (not shown) from a reservoir (not shown) used jointly for all engine cylinders via a line 66 to the storage chamber 64 of which there is one per cylinder and which is filled approximately to the dotted line. A compressed air line 67 is connected to the top side of the storage chamber 64 to maintain the chamber 64 under pressure. The wheel 60 includes a shaft 68 which is driven via a coupling 69 by an electric motor 114 (FIG. 2). The coupling 69 is constructed so that the compartmented wheel 60 remains driven when shifted to the left, as viewed, by the force of a spring 58 opposite to the position shown in FIG. 4, in which the cells 62 are not aligned with the passages 63, 65. As shown in FIG. 4, the left end of the shaft 68 forms a piston and is acted upon by hydraulic fluid supplied through a line 57 connected to the cover 59 of the housing 61. The compressed air acting upon the powdered coal in the storage chamber 64 acts constantly and is therefore not controlled in accordance with the engine cycles. The pressure of the compressed air does not affect the amount of powdered coal supplied to the hollow slider 20. This amount depends solely upon the speed and the transport time of the compartmented wheel 60.

Referring to FIG. 2, wherein the hollow sider 20 is shown schematically simplified, as are the connections for the supply and, if applicable, discharge of the various media, the coolant flowing through the injection nozzle 3 and consisting of Diesel oil is taken from a tank 101 by means of a low pressure pump 100 and is fed via the line 10 to the cooling system 14 – 18 of the injection nozzle 3. The coolant return line 11 leads back into the tank 101. The valves shown in the lines 10 and 11 are to symbolize the flow resistance of the coolant duct system. A line 102 branches off from the line 10 to form a suction line of a high pressure pump 103. The feed line 104 of the high pressure pump 103 is connected on the one hand, via a controlled valve 105 and the check valve 31, to the duct 26 which carries the pressure medium actuating the hollow slider 20. On the other hand, the feed line 104 is connected via a controlled valve 106 to the line 57 whose pressure medium causes the compartmented wheel 60 to shift. A line 107 containing a controlled valve 108 and leading back to the pressure medium tank 101 branches off from the line 57 downstream of the controlled valve 106. A line 109 branches off from the line 26 between the controlled valve 105 and the check valve 31 and ends in the line 27 which contains a controlled valve 110 and also leads back to the tank 101. Both the low pressure pump 100 and the high pressure pump 103 are equipped in the usual manner with overflow lines 111 and 112, respectively, and with overflow valves therein. The feed line 104 of the high pressure pump 103 is connected in a known manner to an expansion chamber 99, also called bubble chamber.

An electric control unit 98 is used for the control of the valves 105, 106, 108 and 110 as well as of the motor 114 driving the compartmented wheel 60. This electric control unit 98 is connected via a signal line each to the respective valve or motor. In addition, the control unit 98 is connected via a signal line to a transmitter 97 which senses the phase position or the crank angle. The control of the valves 105, 106, 108 and 110 as well as of the speed of the motor 114 is effected in a known manner as a function of the phase of the crank shaft 113. An adjusting member 96 of the control unit 98 allows an adjustment of the speed of the motor 114 and the time during which the valve 106 is open and the valve 108 closed so that the amount of powdered coal transported by the compartmented wheel 60 is thus variable. Another adjusting member 95 of the control unit 98 allows an adjustment of the time during which the valve 105 is open and the valve 110 is closed so that the point EB (FIG. 5) at which the injection of fuel into the combustion chamber 9 starts can be varied.

The bores 53, 54 in the part 51 of the insert 50 serve as an ignition oil outlet for ejecting oil into the nozzle 3 and communicate with a control means which ejects a predetermined amount of oil via the bores 53, 54 before introduction of a charge of powdered fuel from the dosing means. This control means includes a pump 115 having a piston 117 driven via a cam 116 by a cam shaft 118 which is connected to the crank shaft 113 by gearing. The ignition oil is taken through a line 119 from the output line of the low pressure pump 100 and is fed to the cylinder of the pump 115 via a controlled suction valve 120. A pressure line 55 leads from this cylinder via a check valve 121 to the bore 53, 54 in the streamlined part 51. The valve body of the suction valve 120 is positively connected to the piston 117 through a linkage 122 and a dual-armed lever 123. Thus, the valve body of the suction valve 120 is opened and hence the volume drawn-in is influenced as a function of the motion of the piston 117. An adjusting lever 124 is coupled to the dual-armed lever 123 so that the closing point of the suction valve 120 is adjustable by means of this lever 124.

The compressed air serving for the injection of fuel into the combustion chamber 9 is supplied from a suitable source (not shown) via a line 90. The line 67 leading to the storage chamber 64 in which a supply of fuel is stored upstream of the dosing means branches off the line 90. A control member 91 is contained in the line 67 in order to control the pressure in the storage chamber 64 so that filling of the cells 62 of the wheel 60 is assured at the highest speed of the wheel 60.

Figure 5A:
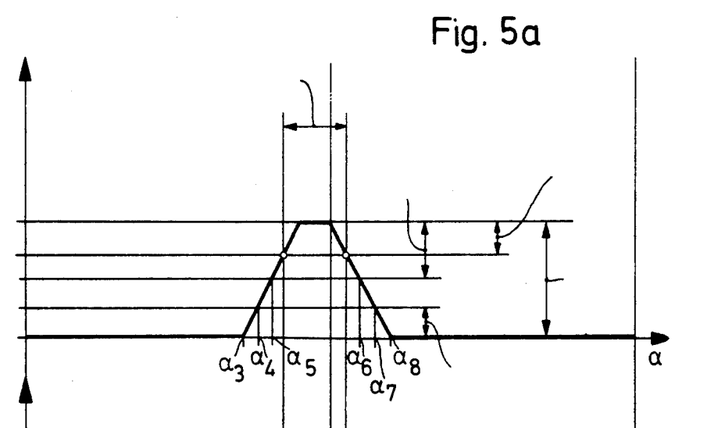
FIGS. 5a and 5c illustrate various control diagrams in accordance with the invention.
Figure 5B:
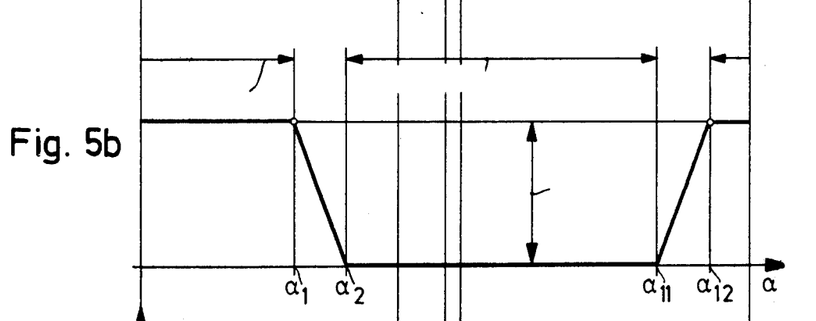
Figure 5C:
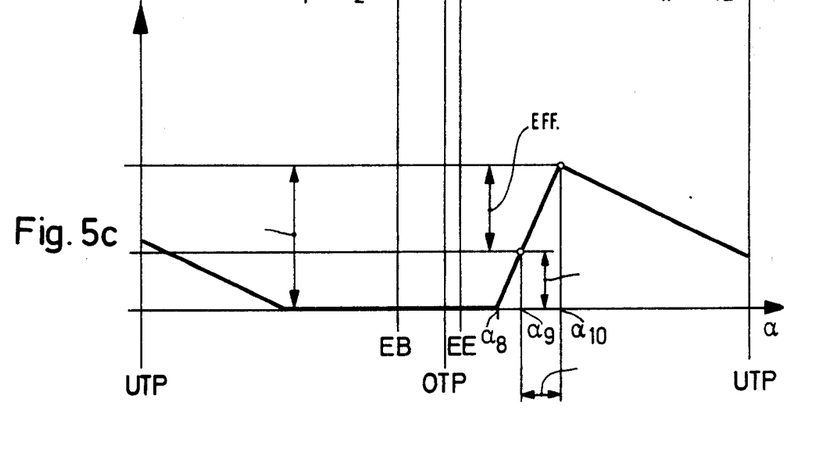

Referring to the control diagrams of FIGS. 5a to c, the following sequence of motions takes place: At the bottom dead center UTP of the working piston 2 of the engine operating on the two-cycle principle, the hollow slider 20 is in the lower position shown in FIG. 1. In this position, the supply of blasting air through the ducts 33, 35 is blocked (FIG. 5a) from passing to the discharge openings 6. Moreover, the compartmented wheel 60 is in the filling position shown in FIG. 4, i.e. the feeding of powdered coal from the storage chamber 64 via the compartmented wheel 60 into the hollow slider 20 is in progress (FIG. 5b). The powdered coal dropping into the hollow slider 20 during this process collects above a layer of ignition oil which was introduced into the hollow slider 20 earlier through the bore 53 and has spread over the face of the extension 7c of the cover 7 projecting into the hollow slider 20. At the time $\alpha_1$, approximately after one quarter turn of the crank shaft 113, the controlled valve 106 is closed and the controlled valve 108 opened. Thus, the compartmented wheel 60 shifts from the filling position to the left in FIG. 4 so that the cells 62 are moved outside of the area of the passages 63 and 65 and the supply of powdered coal into the hollow slider 20 is interrupted. The shifting motion is concluded at the time $\alpha_2$. Shortly thereafter, the controlled valve 105 opens while the controlled valve 110 is being closed. Now, hydraulic fluid flows through the check valve 31, the line 26 and the bores 24 into the annular chamber 19 so that the hollow slider 20 starts moving upwards ($\alpha_3$, FIG. 5a). At the time $\alpha_4$, the upper end of the hollow slider 20 pushes over the streamlined part 51 so that the chamber in the hollow slider 20 is sealed off against the dosing means. At the time $\alpha_5$, the upper air apertures 37 of the hollow slider 20 begin to pass the lower boundary of the inner annular groove 36 of the blasting air supply ducts 35 so that the blasting air now enters the chamber defined by the hollow slider 20. At the time EB, the lower air apertures 38 of the hollow slider 20 reach the area of the fuel discharge openings 6 of the nozzle 3, and the injection of the fuel located in the hollow slider 20 starts, i.e. the injection of the ignition oil and of the charge of powdered coal lying on top of the cover extension 7c. At the top dead center OTP of the working piston 2, the valves 105 and 110 are reversed, i.e. the valve 105 closes and the valve 110 opens so that the downward motion of the hollow slider 20 not commences. Shortly thereafter, the lower air apertures 38 move out of the area of the fuel discharge openings 6, thus concluding the injection process (time EE). At the time $\alpha_6$, the upper air apertures 37 leave the area of the annular groove 36 so that the supply of blasting air is again interrupted while, at the time $\alpha_7$, the upper end of the hollow slider 20 reestablishes the connection to the dosing means. At the time $\alpha_8$, the hollow slider 20 has regained the lower position shown in FIG. 1. Approximately at the same moment, the pistion 117 of the ignition oil pump 115 starts moving upward (FIG. 5c); the suction valve 120 being kept open until the time $\alpha_9$. The effective pump stroke then starts, i.e. ignition oil is introduced into the hollow slider 20 via the check valve 121, the line 55 and the bores 54 and 53. This feeding of ignition oil is concluded at the time $\alpha_{10}$. At the time $\alpha_{11}$ (FIG. 5b), the valves 106, 108 are reversed, i.e. the valve 108 closes and the valve 106 opens so that the compartmented wheel 60 is shifted back into the filling position shown in FIG. 4, which is reached at the time $\alpha_{12}$ shortly before the bottom dead center of the working piston 2. Now, a fresh charge of powdered coal is introduced into the hollow slider 20 by the dosing means. During the time span from $\alpha_2$ to $\alpha_{11}$ (FGI. 5b), the storage chamber 64 was refilled.

In place of the described ignition by means of ignition oil, it is also possible to accomplish the ignition of the powdered coal by means of an incandescent plug.

In summary, the operation of a cylinder of the engine is as follows. First, in the position shown in FIG. 1, ignition oil is ejected via the ignition oil inlet 53 into the nozzle 3. Next, a charge of powdered coal is supplied from the dosing means via the insert 50 and hollow slider 20 into the nozzle 3. In this position, the slider 20 blocks the connection between the air supply means and discharge openings 6 while establishing a connection between the dosing means and the space surrounded by the slider 20. Thereafter, the hydraulic means raises the slider 20 via the piston 21 to the upper position to interrupt the connection between the dosing means and the space and, shortly thereafter, establishes the connection between the air supply means and discharge openings 6. The compressed air then blasts the coal and oil mixture through the discharge openings into the combustion chamber 9. Next, the hydraulic pressure on the piston 21 is relieved so that the slider 20 returns to the position as shown in FIG. 1 to begin a new cycle.

What is claimed is:

1. In a reciprocating internal combustion engine, the combination comprising
   at least one cylinder defining a combustion chamber;
   means for supplying powdered fuel into said chamber, said means including an injection nozzle protruding into said combustion chamber and having a plurality of discharge openings therein for passage of the fuel into said combustion chamber and a cover having an extension projecting into said nozzle to the area of said discharge openings to receive a charge of powdered fuel thereon;
   an air supply means for supplying air into said nozzle for passage through said discharge openings;
   a hollow slider mounted in said nozzle for movement between a first position to establish a connection between said air supply means and said discharge openings to permit injection of a charge of powdered fuel on said extension into said combustion chamber and a second position blocking said connection; and
   a dosing means in communication with said hollow slider for supplying a charge of powdered fuel into said nozzle and onto said extension.

2. The combination as set forth in claim 1 wherein said hollow slider establishes a second connection between said dosing means and said discharge openings in said second position and interrupts said second connection in said first position.

3. The combination as set forth in claim 1 wherein said nozzle has at least one duct connected to said air supply means for the introduction of air into said nozzle and said hollow slider has two groups of apertures, each said group of apertures being aligned respectively with said duct and said discharge openings in said first position of said slider and being displaced respectively from said duct and said discharge openings in said second position.

4. The combination as set forth in claim 1 wherein said hollow slider has a piston thereon, and which further includes a compression spring biased against one side of said piston and a hydraulic means communicating with the opposite side of said piston to move said piston against said spring.

5. The combination as set forth in claim 1 which further includes a pressurized storage chamber upstream of said dosing means for storing a supply of powdered fuel.

6. The combination as set forth in claim 1 which further comprises an ignition oil inlet for injecting oil into said nozzle.

7. The combination as set forth in claim 3 which further comprises a control means for injecting a predetermined amount of oil into said nozzle before introduction of a charge of powdered fuel.

8. The combination as set forth in claim 1 which further comprises cooling means for cooling said nozzle.

9. The combination as set forth in claim 8 wherein said cooling means employs a liquid fuel as a coolant.

10. The combination as set forth in claim 1 which further comprises a hydraulic means for moving said slider from said second position to said first position to permit charging of the fuel into said nozzle from said dosing means.

11. The combination as set forth in claim 10 which further comprises a spring for moving said slider from said first position to said second position to permit entry of air into said nozzle from said air supply means to blast the fuel in said nozzle through said discharge opening into said combustion chamber.

12. The combination as set forth in claim 1 wherein said dosing means includes a rotatable wheel having compartments for receiving and dispensing individual charges of fuel to said injection nozzle.

13. The combination as set forth in claim 12 which further comprises means for rotating said wheel at an adjustable rate of speed.

14. The combination as set forth in claim 12 which further includes a pressurized storage chamber upstream of said dosing means for storing a supply of powdered fuel and wherein said wheel is shiftable from a dosing position below said storage chamber to receive fuel to a blocked position interrupting a flow of fuel from said storage chamber.

15. The combination as set forth in claim 14 wherein said wheel has a shaft and said dosing means further includes a pressurized cylinder enclosing one end of said shaft and a spring biasing the opposite end of said shaft towards said pressurized chamber.

16. The combination as set forth in claim 14 wherein said wheel has a shaft and said dosing means further includes a pressurized cylinder enclosing one end of said shaft and a spring biasing the opposite end of said shaft towards said pressurized chamber and wherein said hollow slider has a piston thereon, and which further includes a compression spring biased against one side of said piston and a hydraulic means communicating with the opposite side of said piston to move said piston against said spring and with said pressurized cylinder to supply a hydraulic fluid thereto.

* * * * *

UNITED STATES PATENT AND TRADEMARK OFFICE
CERTIFICATE OF CORRECTION

PATENT NO. : 4,070,997
DATED : January 31, 1978
INVENTOR(S) : Anton Steiger

It is certified that error appears in the above-identified patent and that said Letters Patent are hereby corrected as shown below:

```
Column 1, line 10, change "cobustion" to -- combustion --
Column 1, line 36, after "uniform." delete -- (Fig. --
Column 1, line 49, change "tupe" to -- type --
Column 2, line 25, change "and" to -- to --
Column 3, line 42 change "comminucates" to -- communicates --
Column 3, lines 50 - 51 change "communicates" to --communicate--
Column 4, line 2 change "include" to -- includes --
Column 4, line 8 change "4." to -- 4 --
Column 5, line 20 after "110" delete -- is --
Column 6, line 32 change "not" to -- now --
Column 6, line 42 change "pistion" to -- piston --
Column 6, line 56 change "FGI" to -- FIG --
```

Signed and Sealed this

Eleventh Day of July 1978

[SEAL]

Attest:

RUTH C. MASON
*Attesting Officer*

DONALD W. BANNER
*Commissioner of Patents and Trademarks*